(12) United States Patent
Hamm et al.

(10) Patent No.: US 9,633,327 B2
(45) Date of Patent: Apr. 25, 2017

(54) SENSOR ZONE MANAGEMENT

(75) Inventors: Mark D. Hamm, Germantown, TN (US); Miley E. Ainsworth, Harnando, MS (US)

(73) Assignee: FedEx Corporate Services, Inc., Collierville, TN (US)

( * ) Notice: Subject to any disclaimer, the term of this patent is extended or adjusted under 35 U.S.C. 154(b) by 531 days.

(21) Appl. No.: 12/566,890

(22) Filed: Sep. 25, 2009

(65) Prior Publication Data

US 2011/0078089 A1 Mar. 31, 2011

(51) Int. Cl.
    *G07B 15/00* (2011.01)
    *G08B 1/08* (2006.01)
    *G06Q 10/08* (2012.01)

(52) U.S. Cl.
    CPC ....... *G06Q 10/087* (2013.01); *G06Q 10/0833* (2013.01)

(58) Field of Classification Search
    CPC ...................................................... G07C 5/008
    USPC ...................... 705/33 X; 340/539.12, 539.27
    See application file for complete search history.

(56) References Cited

U.S. PATENT DOCUMENTS

| | | |
|---|---|---|
| 5,223,844 A | 6/1993 | Mansell et al. |
| 5,347,274 A | 9/1994 | Hassett |
| 5,389,934 A | 2/1995 | Kass |
| 5,400,020 A | 3/1995 | Jones et al. |
| 5,461,365 A | 10/1995 | Schlager et al. |
| 5,491,486 A | 2/1996 | Welles, II et al. |
| 5,512,902 A | 4/1996 | Guthrie et al. |
| 5,515,858 A | 5/1996 | Myllymaki |
| 5,528,247 A | 6/1996 | Nonami |
| 5,539,748 A | 7/1996 | Raith |
| 5,541,845 A | 7/1996 | Klein |
| 5,550,551 A | 8/1996 | Alesio |
| 5,568,119 A | 10/1996 | Schipper |
| 5,570,412 A | 10/1996 | LeBlanc |
| 5,576,716 A | 11/1996 | Sadler |
| 5,588,005 A | 12/1996 | Ali et al. |

(Continued)

FOREIGN PATENT DOCUMENTS

| | | |
|---|---|---|
| EP | 1 037 447 A2 | 9/2000 |
| EP | 1189163 A2 | 3/2002 |

(Continued)

OTHER PUBLICATIONS

International Search Report for related PCT Application No. PCT/US2010/04928 dated Sep. 2, 2011 (8 pages).

(Continued)

*Primary Examiner* — Brian Epstein
(74) *Attorney, Agent, or Firm* — Finnegan, Henderson, Farabow, Garrett & Dunner, L.L.P.

(57) ABSTRACT

Systems, methods, and computer program products are provided for tracking one or more items. In one exemplary embodiment, there is provided a method for tracking an item. The method may include periodically detecting sensor information of an item by a sensor device. The method may also include periodically transmitting the sensor information by the sensor device. The method may also include receiving the sensor information at a tracking center, storing the sensor information in a database, and reviewing the stored sensor information. The method may further include using the stored sensor information to update shipment information for a package.

21 Claims, 4 Drawing Sheets

(56) References Cited

U.S. PATENT DOCUMENTS

| | | |
|---|---|---|
| 5,592,173 A | 1/1997 | Lau et al. |
| 5,608,412 A | 3/1997 | Welles, II et al. |
| 5,623,260 A | 4/1997 | Jones |
| 5,623,418 A | 4/1997 | Rostoker et al. |
| 5,627,517 A | 5/1997 | Theimer et al. |
| 5,629,678 A | 5/1997 | Gargano et al. |
| 5,631,827 A | 5/1997 | Nicholls et al. |
| 5,648,770 A | 7/1997 | Ross |
| 5,652,570 A | 7/1997 | Lepkofker |
| 5,686,888 A | 11/1997 | Welles, II et al. |
| 5,691,980 A | 11/1997 | Welles, II et al. |
| 5,710,551 A | 1/1998 | Ridgeway |
| 5,712,619 A | 1/1998 | Simkin |
| 5,731,757 A | 3/1998 | Layson, Jr. |
| 5,742,233 A | 4/1998 | Hoffman et al. |
| 5,751,245 A | 5/1998 | Janky et al. |
| 5,771,001 A | 6/1998 | Cobb |
| 5,771,455 A | 6/1998 | Kennedy, III et al. |
| 5,774,876 A | 6/1998 | Woolley et al. |
| 5,797,091 A | 8/1998 | Clise et al. |
| RE35,920 E | 10/1998 | Sorden et al. |
| 5,826,195 A | 10/1998 | Westerlage et al. |
| 5,835,907 A | 11/1998 | Newman |
| 5,841,352 A | 11/1998 | Prakash |
| 5,844,862 A | 12/1998 | Cocatre-Zilgien |
| 5,850,196 A | 12/1998 | Mowers |
| 5,869,819 A | 2/1999 | Knowles et al. |
| 5,889,770 A | 3/1999 | Jokiaho et al. |
| 5,892,441 A | 4/1999 | Woolley et al. |
| 5,917,433 A * | 6/1999 | Keillor et al. ............... 340/989 |
| 5,948,043 A | 9/1999 | Mathis |
| 5,959,575 A | 9/1999 | Abbott |
| 5,963,130 A | 10/1999 | Schlager et al. |
| 5,982,807 A | 11/1999 | Snell |
| 5,983,108 A | 11/1999 | Kennedy, III et al. |
| 6,002,363 A | 12/1999 | Krasner |
| 6,002,982 A | 12/1999 | Fry |
| 6,009,319 A | 12/1999 | Khullar et al. |
| 6,013,007 A | 1/2000 | Root et al. |
| 6,014,080 A | 1/2000 | Layson, Jr. |
| 6,014,090 A | 1/2000 | Rosen et al. |
| 6,023,241 A | 2/2000 | Clapper |
| 6,031,496 A | 2/2000 | Kuittinen et al. |
| 6,032,051 A | 2/2000 | Hall et al. |
| 6,034,622 A | 3/2000 | Levine |
| 6,054,928 A | 4/2000 | Lemelson et al. |
| 6,064,336 A | 5/2000 | Krasner |
| 6,067,044 A | 5/2000 | Whelan et al. |
| 6,072,396 A | 6/2000 | Gaukel |
| 6,078,290 A | 6/2000 | McBurney et al. |
| 6,083,248 A | 7/2000 | Thompson |
| 6,083,353 A | 7/2000 | Alexander, Jr. |
| 6,094,168 A | 7/2000 | Duffett-Smith et al. |
| 6,094,642 A | 7/2000 | Stephenson et al. |
| 6,101,710 A | 8/2000 | Selinger et al. |
| 6,111,540 A | 8/2000 | Krasner |
| 6,121,922 A | 9/2000 | Mohan |
| 6,131,067 A | 10/2000 | Girerd et al. |
| 6,141,570 A | 10/2000 | O'Neill, Jr. et al. |
| 6,144,303 A | 11/2000 | Federman |
| 6,148,280 A | 11/2000 | Kramer |
| 6,163,696 A | 12/2000 | Bi et al. |
| 6,171,264 B1 | 1/2001 | Bader |
| 6,172,640 B1 | 1/2001 | Durst et al. |
| 6,175,616 B1 | 1/2001 | Light et al. |
| 6,198,390 B1 | 3/2001 | Schlager et al. |
| 6,198,431 B1 | 3/2001 | Gibson |
| 6,198,930 B1 | 3/2001 | Schipper |
| 6,199,045 B1 | 3/2001 | Giniger et al. |
| 6,220,509 B1 | 4/2001 | Byford |
| 6,226,622 B1 | 5/2001 | Dabbiere |
| 6,231,519 B1 | 5/2001 | Blants et al. |
| 6,232,916 B1 | 5/2001 | Grillo et al. |
| 6,236,358 B1 | 5/2001 | Durst et al. |
| 6,238,337 B1 | 5/2001 | Kambhatla et al. |
| 6,243,039 B1 | 6/2001 | Elliot |
| 6,243,660 B1 | 6/2001 | Hsu et al. |
| 6,246,376 B1 | 6/2001 | Bork et al. |
| 6,255,942 B1 | 7/2001 | Knudsen |
| 6,263,280 B1 | 7/2001 | Stingone, Jr. |
| 6,278,936 B1 | 8/2001 | Jones |
| 6,281,797 B1 * | 8/2001 | Forster et al. ............. 340/572.3 |
| 6,292,687 B1 | 9/2001 | Lowell et al. |
| 6,292,724 B1 | 9/2001 | Apsell et al. |
| 6,292,784 B1 | 9/2001 | Martin et al. |
| 6,298,306 B1 | 10/2001 | Suarez et al. |
| 6,300,875 B1 | 10/2001 | Schafer |
| 6,304,856 B1 | 10/2001 | Soga et al. |
| 6,314,308 B1 | 11/2001 | Sheynblat et al. |
| 6,317,049 B1 | 11/2001 | Toubia et al. |
| 6,323,807 B1 | 11/2001 | Golding et al. |
| 6,324,213 B1 | 11/2001 | Harrison |
| 6,327,533 B1 | 12/2001 | Chou |
| 6,331,817 B1 | 12/2001 | Goldberg |
| 6,339,397 B1 | 1/2002 | Baker |
| 6,340,928 B1 | 1/2002 | McCurdy |
| 6,349,257 B1 | 2/2002 | Liu et al. |
| 6,353,390 B1 | 3/2002 | Beri et al. |
| 6,353,798 B1 | 3/2002 | Green et al. |
| 6,356,841 B1 | 3/2002 | Hamrick et al. |
| 6,362,778 B2 | 3/2002 | Neher |
| 6,363,254 B1 | 3/2002 | Jones et al. |
| 6,363,323 B1 | 3/2002 | Jones |
| 6,377,810 B1 | 4/2002 | Geiger et al. |
| 6,388,612 B1 | 5/2002 | Neher |
| 6,404,352 B1 | 6/2002 | Ichikawa et al. |
| 6,407,698 B1 | 6/2002 | Ayed |
| 6,411,892 B1 | 6/2002 | van Diggelen |
| 6,411,899 B2 | 6/2002 | Dussell et al. |
| 6,421,538 B1 | 7/2002 | Byrne |
| 6,426,719 B1 | 7/2002 | Nagareda et al. |
| 6,427,120 B1 | 7/2002 | Garin et al. |
| 6,429,810 B1 | 8/2002 | De Roche |
| 6,430,602 B1 | 8/2002 | Kay et al. |
| 6,433,732 B1 | 8/2002 | Dutta et al. |
| 6,435,018 B1 | 8/2002 | Murakami et al. |
| 6,441,778 B1 | 8/2002 | Durst et al. |
| 6,442,380 B1 | 8/2002 | Mohindra |
| 6,445,937 B1 | 9/2002 | daSilva |
| 6,452,572 B1 | 9/2002 | Fan et al. |
| 6,453,237 B1 | 9/2002 | Fuchs et al. |
| 6,459,365 B2 | 10/2002 | Tamura |
| 6,463,272 B1 | 10/2002 | Wallace et al. |
| 6,463,420 B1 | 10/2002 | Guidice et al. |
| 6,469,639 B2 | 10/2002 | Tanenhaus et al. |
| 6,471,087 B1 | 10/2002 | Shusterman |
| 6,478,736 B1 | 11/2002 | Mault |
| 6,480,108 B2 | 11/2002 | McDonald |
| 6,484,079 B2 | 11/2002 | Buckelew et al. |
| 6,496,695 B1 | 12/2002 | Kouji et al. |
| 6,496,775 B2 | 12/2002 | McDonald, Jr. et al. |
| 6,496,777 B2 | 12/2002 | Tennison et al. |
| 6,512,478 B1 | 1/2003 | Chien |
| 6,513,532 B2 | 2/2003 | Mault et al. |
| 6,522,871 B1 | 2/2003 | Patrick et al. |
| 6,522,889 B1 | 2/2003 | Aarnio |
| 6,529,164 B1 | 3/2003 | Carter |
| 6,544,193 B2 | 4/2003 | Abreu |
| 6,552,652 B2 | 4/2003 | Beken |
| 6,559,620 B2 | 5/2003 | Zhou et al. |
| 6,559,802 B2 | 5/2003 | Goto et al. |
| 6,569,094 B2 | 5/2003 | Suzuki et al. |
| 6,579,231 B1 | 6/2003 | Phipps |
| 6,611,755 B1 | 8/2003 | Coffee et al. |
| 6,625,437 B1 | 9/2003 | Jampolsky et al. |
| 6,640,085 B1 | 10/2003 | Chatzipetros et al. |
| 6,650,907 B1 | 11/2003 | Kamperschroer et al. |
| 6,656,125 B2 | 12/2003 | Misczynski et al. |
| 6,721,542 B1 | 4/2004 | Anttila et al. |
| 6,747,675 B1 | 6/2004 | Abbott et al. |
| 6,748,318 B1 | 6/2004 | Jones |
| 6,772,130 B1 | 8/2004 | Karbowski et al. |
| 6,801,850 B1 | 10/2004 | Wolfson |
| 6,804,606 B2 | 10/2004 | Jones |

(56) References Cited

U.S. PATENT DOCUMENTS

| | | | |
|---|---|---|---|
| 6,812,840 B2 | 11/2004 | Gehlot et al. | |
| 6,847,892 B2 | 1/2005 | Zhou et al. | |
| 6,856,804 B1 | 2/2005 | Ciotta | |
| 6,924,750 B2 | 8/2005 | Flick | |
| 6,952,645 B1 | 10/2005 | Jones | |
| 6,975,941 B1 | 12/2005 | Lau et al. | |
| 6,976,007 B1 | 12/2005 | Boucher et al. | |
| 7,002,451 B2 | 2/2006 | Freeman | |
| 7,034,683 B2 | 4/2006 | Ghazarian | |
| 7,035,856 B1 | 4/2006 | Morimoto | |
| 7,098,784 B2 * | 8/2006 | Easley et al. | 340/539.13 |
| 7,113,784 B2 | 9/2006 | Fujiwara et al. | |
| 7,142,110 B2 * | 11/2006 | Schmidtberg et al. | 340/539.27 |
| 7,174,173 B1 | 2/2007 | Needham et al. | |
| 7,187,278 B2 | 3/2007 | Biffar | |
| 7,202,801 B2 | 4/2007 | Chou | |
| 7,212,829 B1 * | 5/2007 | Lau et al. | 455/456.1 |
| 7,243,080 B2 | 7/2007 | Bhadra | |
| 7,253,731 B2 | 8/2007 | Joao | |
| 7,258,276 B2 | 8/2007 | Linton et al. | |
| 7,455,225 B1 * | 11/2008 | Hadfield et al. | 235/384 |
| 7,512,515 B2 | 3/2009 | Vock et al. | |
| 7,552,031 B2 | 6/2009 | Vock et al. | |
| 7,627,666 B1 | 12/2009 | DeGiulio et al. | |
| 7,791,455 B1 | 9/2010 | MacLean, III et al. | |
| 8,019,740 B2 | 9/2011 | Weng et al. | |
| 8,279,067 B2 * | 10/2012 | Berger | G06Q 10/08 340/539.13 |
| 2001/0020204 A1 | 9/2001 | Runyon et al. | |
| 2001/0028304 A1 | 10/2001 | I'Anson et al. | |
| 2001/0044299 A1 | 11/2001 | Sandegren | |
| 2001/0047244 A1 | 11/2001 | Harrison et al. | |
| 2001/0052849 A1 | 12/2001 | Jones, Jr. | |
| 2002/0000930 A1 | 1/2002 | Crowson et al. | |
| 2002/0014955 A1 | 2/2002 | Klitsgaard | |
| 2002/0016171 A1 | 2/2002 | Doganata et al. | |
| 2002/0027507 A1 | 3/2002 | Yarin et al. | |
| 2002/0038182 A1 | 3/2002 | Wong et al. | |
| 2002/0050945 A1 | 5/2002 | Tsukishima et al. | |
| 2002/0057192 A1 | 5/2002 | Eagleson et al. | |
| 2002/0061758 A1 | 5/2002 | Zarlengo et al. | |
| 2002/0070856 A1 | 6/2002 | Wolfe | |
| 2002/0077080 A1 | 6/2002 | Greene | |
| 2002/0087260 A1 | 7/2002 | Hancock et al. | |
| 2002/0087619 A1 | 7/2002 | Tripathi | |
| 2002/0099567 A1 * | 7/2002 | Joao | 705/1 |
| 2002/0111171 A1 | 8/2002 | Boesch et al. | |
| 2002/0111819 A1 | 8/2002 | Li et al. | |
| 2002/0115453 A1 | 8/2002 | Poulin et al. | |
| 2002/0119789 A1 | 8/2002 | Friedman | |
| 2002/0120475 A1 | 8/2002 | Morimoto | |
| 2002/0143670 A1 | 10/2002 | Cushing et al. | |
| 2002/0165638 A1 | 11/2002 | Bancroft et al. | |
| 2002/0175805 A9 | 11/2002 | Armstrong et al. | |
| 2002/0187025 A1 | 12/2002 | Speasl et al. | |
| 2002/0193121 A1 | 12/2002 | Nowak et al. | |
| 2003/0001742 A1 | 1/2003 | Eshelman et al. | |
| 2003/0003943 A1 | 1/2003 | Bajikar | |
| 2003/0004403 A1 | 1/2003 | Drinan et al. | |
| 2003/0061176 A1 | 3/2003 | Hoar | |
| 2003/0069002 A1 | 4/2003 | Hunter et al. | |
| 2003/0069759 A1 | 4/2003 | Smith | |
| 2003/0084005 A1 | 5/2003 | Wong et al. | |
| 2003/0115978 A1 | 6/2003 | Moehnke et al. | |
| 2003/0137968 A1 * | 7/2003 | Lareau et al. | 370/349 |
| 2003/0151507 A1 | 8/2003 | Andre et al. | |
| 2003/0163287 A1 | 8/2003 | Vock et al. | |
| 2003/0177094 A1 * | 9/2003 | Needham et al. | 705/50 |
| 2003/0204452 A1 | 10/2003 | Wheeler | |
| 2004/0034470 A1 | 2/2004 | Workman | |
| 2004/0046637 A1 | 3/2004 | Wesby Van Swaay | |
| 2004/0117108 A1 | 6/2004 | Nemeth | |
| 2004/0174259 A1 * | 9/2004 | Peel et al. | 340/539.26 |
| 2004/0174260 A1 * | 9/2004 | Wagner | 340/568.1 |
| 2004/0178880 A1 * | 9/2004 | Meyer | B60R 25/1004 340/5.22 |
| 2004/0233041 A1 * | 11/2004 | Bohman et al. | 340/10.1 |
| 2005/0071258 A1 | 3/2005 | Kumakawa | |
| 2005/0197844 A1 * | 9/2005 | Ng | G06Q 10/08 705/333 |
| 2005/0247775 A1 * | 11/2005 | Gloekler et al. | 235/375 |
| 2006/0109106 A1 * | 5/2006 | Braun | 340/539.13 |
| 2006/0112418 A1 * | 5/2006 | Bantz et al. | 726/4 |
| 2006/0173444 A1 | 8/2006 | Choy et al. | |
| 2006/0187026 A1 | 8/2006 | Kochis | |
| 2007/0040647 A1 * | 2/2007 | Saenz et al. | 340/3.1 |
| 2007/0095905 A1 * | 5/2007 | Kadaba | 235/384 |
| 2007/0115859 A1 * | 5/2007 | Meyers | 370/254 |
| 2007/0188322 A1 * | 8/2007 | English et al. | 340/539.26 |
| 2007/0290836 A1 | 12/2007 | Ainsworth et al. | |
| 2008/0021953 A1 | 1/2008 | Gil | |
| 2008/0034224 A1 * | 2/2008 | Ferren et al. | 713/193 |
| 2008/0042809 A1 * | 2/2008 | Watts | B60R 25/1003 340/426.16 |
| 2008/0125724 A1 * | 5/2008 | Monroe | 604/264 |
| 2008/0129490 A1 * | 6/2008 | Linville et al. | 340/539.13 |
| 2008/0231454 A1 * | 9/2008 | Curcio | 340/572.2 |
| 2009/0061897 A1 * | 3/2009 | Hamilton et al. | 455/456.2 |
| 2009/0150114 A1 | 6/2009 | Vock et al. | |
| 2009/0292682 A1 | 11/2009 | Robbins | |
| 2009/0295564 A1 * | 12/2009 | Twitchell, Jr. | 340/539.1 |
| 2010/0090822 A1 * | 4/2010 | Benson et al. | 340/508 |
| 2010/0127881 A1 * | 5/2010 | Schechter | H05K 7/20836 340/584 |
| 2010/0332284 A1 | 12/2010 | Hilbush et al. | |

FOREIGN PATENT DOCUMENTS

| | | |
|---|---|---|
| GB | 2329491 A | 9/1997 |
| WO | WO 97/41654 | 11/1997 |
| WO | WO 98/01769 | 1/1998 |
| WO | WO 98/16045 | 4/1998 |
| WO | WO 00/51391 | 8/2000 |
| WO | WO 01/50151 A1 | 7/2001 |
| WO | WO 01/65444 A1 | 9/2001 |
| WO | WO 01/75700 A2 | 10/2001 |
| WO | WO 01/97167 A2 | 10/2001 |
| WO | WO 02/42979 A1 | 5/2002 |
| WO | WO 02/084618 A1 | 10/2002 |
| WO | WO 02/101505 A2 | 12/2002 |
| WO | WO 03/012720 A1 | 2/2003 |

OTHER PUBLICATIONS

CrossCheck™ AMPS with IQ *Event Engine*™ Firmware Operation Manual, Trimble Navigation Limited, Nov. 1998.

CrossChecker® GSM Mobile Unit Operation Manual, Trimble, Jul. 2001.

TAIP/IQEvent Engine Reference, Trimble Navigation Limited, Aug. 1999.

ReZolt Corporate Backgrounder—Letter, RZCORP-111011, found online at www.ReZolt.com.

Venable LLP, Homeland Security Alert, Maritime Transportation Security Act of 2002, Dec. 2002.

Frittelli, Port and Maritime Security: Background and Issues for Congress, CRS Report for Congress, Received through the CRS Web, updated May 27, 2005.

Environmental Cyberinfrastructure Needs for Distributed Sensor Networks, A Report From a National Science Foundation Sponsored Workshop, Scripps Institute of Oceanography, Aug. 2003.

Ruiz-Garcia et al., "Monitoring Cold Chain Logistics by means of RFID," from Sustainable Radio Frequency Identification Solutions, Book edited by Cristina Turcu, Februa 2010.

Shirley et al., "Mars Rovers: Past, Present and Future," Princeton Space Studies Institute's 20th Anniversary Conference, May 1997.

MICA Wireless Measurement System, Crossbow Technology, Inc., San Jose, CA.

Culler et al., "MICA: The Commercialization of Microsensor Motes" Sensors, Apr. 2002.

(56) References Cited

OTHER PUBLICATIONS

Kahn et al., "Next Century Challenges: Mobile Networking for 'Smart Dust', "1999, found online at http://ksuseer1.ist.psu.edu/viewdoc/summary?doi=10.1.35.8873.

Wolfe, "Electronic Cargo Seals: Context, Technologies, and Marketplace," Jul. 2002.

Maestas, "Demonstration of the Radio Frequency Identification Transportation Security and Safety System," Oct. 15, 2003.

Remote Sensing for Transportation, Report of a Conference, Washington D.C., Dec. 2000.

Horton et al., "MICA The Commercialization of Microsensor Motes," Sensor Technology and Design, Apr. 2002.

System Planning Corp. helps evaluate seamless container-security Commerce, The Journal of Commerce, May 2005.

Prasad et al., "Application of Shape Analysis to domestic and international security," Institute of Nuclear Materials Management Conference 2002, Orlando, Florida, Jun. 2002.

Spencer et al., "Smart Sensing Technology: Opportunities and Challenges," found online at http://sstl.cee.illinois.edu/papers/Smart_Sensini_Technology.pdf.

Hill "A Software Architecture Supporting Networked Sensors," Dept. of Electrical Engineering and Computer Sciences, U.C. Berkele , Fall 2000.

Kremens et al., "Low Cost Autonomous Field-Deployable Environment Sensors," AIP Conf. Proc. 632, pp. 190-199; doi, found online at http://dx.doi.org/10.1063/1.1513969.

Akyildiz et al., "Wireless Sensor Networks: a Survey," Computer Networks, 38 (2002), pp. 393-422, found online at http://impact.asu.edu/~mcn/papers/sensorpapers/wsn.pdf.

Jacob Fraden, Handbook of Modern Sensors, Springer-Verlag (1996).

Alan Mainwaring et al., *Wireless Sensor Networks for Habitat Monitoring*, ACM / WSNA'02 (Sep. 28, 2002).

Stephen D. Senturia, Microsystem Design, Kluwer Academic Publishers (2001).

Behzad Razavi, RF Microelectronics, Prentice Hall (1998).

Markus Helfenstein et al., Circuits and Systems for Wireless Communications, Kluwer Academic Publishers (2000).

Craig A. Grimes et al., *Wireless Magnetoelastic Resonance Sensors: A Critical Review*, Sensors (Jul. 23, 2002).

Marc J. Madou, Fundamentals of Microfabrication, CRC Press (2002).

Jason Hill et al., *System Architecture Directions for Networked Sensors*, ACM / ASPLOS-IX (Nov. 2000).

Hooman Darabi et al., *A 2.4-GHz CMOS Transceiver for Bluetooth*, IEEE Journal of Solid-State Circuits, vol. 36, No. 12 (Dec. 2001).

Ahmadreza Rofougaran et al., *A Single-Chip 900-MHz Spread-Spectrum Wireless Transceiver in 1-µm CMOS—Part II: Receiver Design*, IEEE Journal of Solid-State Circuits, vol. 33, No. 4 (Apr. 1998).

\* cited by examiner

SENSOR ZONE MANAGEMENT

TECHNICAL FIELD

The present invention generally relates to systems and methods for tracking items. More particularly, the present invention relates to systems and methods for tracking items using a sensor device and using historical information to modify existing or future shipments.

BACKGROUND

Asset management has always been an important part of commerce. For example, tracking packages is important to organizations of all kinds, whether it be a company keeping track of inventory to be sold in its stores, or a package delivery provider keeping track of packages being transported through its delivery network. To provide quality service, an organization typically creates and maintains a highly organized network for tracking its packages. Effective management of such networks allows lower cost, reduced delivery time, and enhanced customer service.

In addition to tracking packages, parties that ship and receive packages may also need information regarding the conditions of the packages, such as the temperature and humidity of the package. For example, a customer that has ordered a box of wine may want to monitor the temperature of the contents of the box to determine if the temperature and/or humidity goes above or below a set range. Likewise, the party that ships the package may also want to monitor the conditions of the package to ensure that the content arrives in the proper condition.

Technological advances have enabled items to be tracked in ways that far exceed the functionality of a simple list. A rich information framework now can be applied to describe the item's interaction with its surroundings, such as transportation and custodial handoffs.

Bar codes are one way organizations keep track of items. A retailer, for example, may use bar codes on items in its inventory. For example, items to be sold in a retailer's store may each be labeled with a different bar code. In order to keep track of inventory, the retailer typically scans the bar code on each item. In addition, when an item is sold to a consumer, the bar code for that item is scanned.

Similarly, a package delivery provider may utilize bar codes by associating a bar code with packages to be delivered to a recipient. For example, a package may have a bar code corresponding to a tracking number for that package. Each time the package goes through a checkpoint (e.g., the courier taking initial control of the package, the package being placed in a storage facility, the package being delivered to the recipient, etc.), the package's bar code may be scanned. Bar codes, however, have the disadvantage that personnel must manually scan each bar code on each item in order to effectively track the items.

Radio-frequency identification (RFID) tags are an improvement over typical bar codes. RFID tags do not require manual scanning that is required by typical bar codes. For example, in a retail context, an RFID tag on an inventory item may be able to communicate with an electronic reader that detects items in a shopping cart and adds the cost of each item to a bill for the consumer. RFID tags have also been used to track things such as livestock, railroad cars, trucks, and even airline baggage. These tags typically only allow for basic tracking and do not provide a way to improve asset management using information about the environment in which the items are tracked.

Sensor-based tracking systems are also known which can provide more information than RFID systems. Such systems, however, can be expensive, and may provide extraneous and redundant item information.

Shippers, carriers, recipients, and other parties often wish to know the location, condition, and integrity of shipments before, during, and after transport to satisfy quality control goals, meet regulatory requirements, and optimize business processes. Moreover, parties may want to use this information to modify existing or future shipments to increase the efficiency and timeliness of transportation. To address these requirements, a system is needed that allows parties to receive information regarding past shipments and use this information to modify existing and/or future shipments.

SUMMARY

In one exemplary embodiment, there is provided a method for using tracking information of a shipment to update shipping information. The method may include periodically detecting sensor information of an item by a sensor device. The method may also include periodically transmitting the sensor information by the sensor device. The method may also include receiving the sensor information at a tracking center, storing the sensor information in a database, and reviewing the stored sensor information. The method may further include using the stored sensor information to update shipment information for a package.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
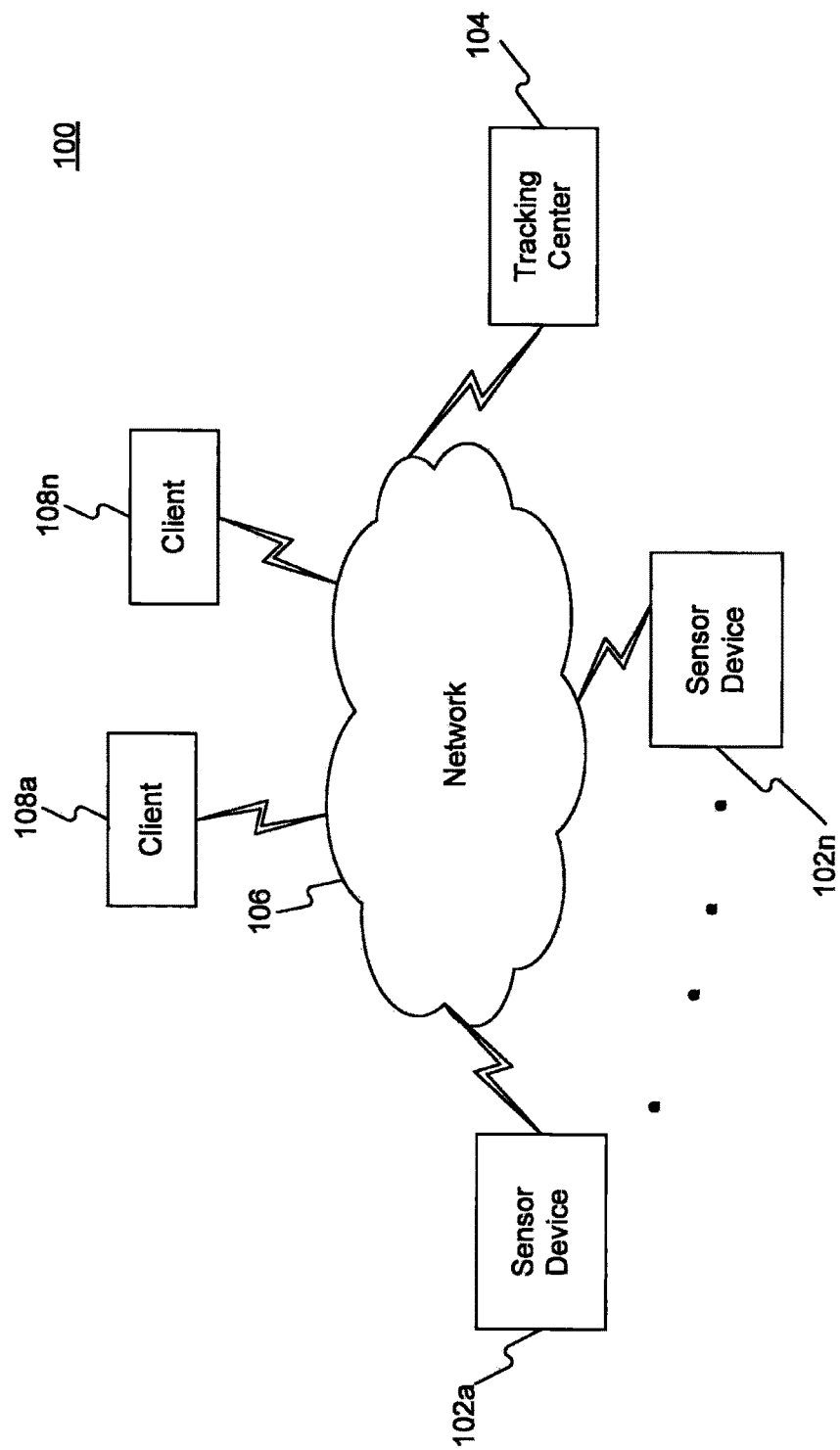
FIG. 1 illustrates an exemplary computing system that can be used to implement embodiments of the invention.

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

System Architecture

By way of a non-limiting example, FIG. 1 illustrates a system 100 in which the features and principles of the present invention may be implemented. The number of components in system 100 is not limited to what is shown and other variations in the number of arrangements of components are possible, consistent with embodiments of the invention. The components of FIG. 1 may be implemented through hardware, software, and/or firmware. System 100 may include sensor devices 102a-102n, a tracking center 104, a network 106, and clients 108a-108n.

Network 106 provides communications between the various entities depicted in system 100. Network 106 may be a shared, public, or private network and may encompass a wide area or local area. Network 106 may be implemented through any suitable combination of wired and/or wireless communication networks (including Wi-Fi networks, GSM/GPRS networks, TDMA networks, CDMA networks, Bluetooth networks, or any other wireless networks). By way of example, network 106 may be implemented through a wide area network (WAN), local area network (LAN), an intranet, and/or the Internet. Further, the entities of system 100 may be connected to multiple networks 106, such as, for example, to a wireless carrier network, a private data network, and the public Internet.

Sensor devices 102a-102n may be devices for use in tracking various items, and may be attached to or included in the items that are to be tracked. For example, sensor device 102a may be attached to or enclosed in a package that is being sent to a recipient using a delivery service such as Federal Express Corporation, ("FedEx"). Alternatively, sensor device 102a may be attached to or enclosed in a container holding inventory being delivered to a retailer. The aforementioned items are exemplary and may comprise any deliverable elements.

Sensor device 102a may store information associated with an item tracking number for a corresponding item. The item tracking number may be a FedEx tracking number or similar tracking number. Sensor device 102a may also store information indicative of other sensor devices which are currently within a given proximity. For example, when an item with a corresponding sensor device 102a is placed inside a vehicle or storage facility that includes at least one other sensor device 102n, sensor device 102a may sense that another sensor device 102n is within a proximity that indicates that the corresponding item is now in the vehicle or storage facility. Information reflecting an association between sensor device 102a and sensor device 102n may then be stored in a memory located at one or more of sensor device 102a, sensor device 102n, and/or tracking center 104.

In one embodiment, sensor device 102a may be capable of measuring or detecting one or more conditions such as location, temperature, light level, motion, pressure, humidity, acceleration, gas level, airflow, vibration, or other environmental conditions. Sensor device 102a may also have the ability to directly transmit and receive information to/from tracking center 104 via network 106 by, for example, wireless communications. For example, sensor device 102a may be implemented using a wireless sensor available from Crossbow Technology. One of ordinary skill in the art will appreciate that alternative sensor devices may be used.

Tracking center 104 may provide a platform for tracking items being delivered to a recipient. Tracking center 104 may be implemented using a combination of hardware, software, and/or firmware, and may be operable to receive and store sensor data from various sensor devices 102a-102n. For example, sensor device 102a may periodically send tracking center 104 sensor data reflecting conditions measured or detected by sensor device 102a. Such sensor data may include location, temperature, light level, motion, pressure, humidity, gas level, airflow, vibrations, or other environmental conditions.

Tracking center 104 is also operable to respond to requests for sensor data. For example, a customer may use client 108a to enter a request for sensor data stored at tracking center 104. The request may include one or more triggering parameters, which can be used to find the requested sensor data. Exemplary triggering parameters may include a sensor identification number, item tracking number, location, temperature, light level, humidity, acceleration, pressure, gas level, airflow, vibrations, etc. Accordingly, by way of example, a customer may request temperature measurements within a certain range of a specific location. The distance from the specific location is the triggering parameter in that case.

When tracking center 104 receives a request for sensor data from client 108a, tracking center 104 may search a database resident at tracking center 104 and return the requested sensor data, if found. Access to the sensor data may be managed or open. For example, if access is managed, client 108a and/or the customer is authenticated before sensor data is made available to client 108a and/or the customer. In addition to or instead of searching a database for sensor data, tracking center 104 may request sensor data directly from the relevant sensor device 102a.

Tracking center 104 may also provide updated and/or new programming for sensor device 102a. Programming, for example, may specify the manner in which a device senses environmental conditions. Programming of the aforementioned device may be altered, for example, by storing new or modified instructions in a memory (not shown) located at the respective device. Programming changes may be made arbitrarily (e.g., at the discretion of a programmer) or in response to a detected condition. For example, suppose sensor device 102a detects a temperature above a certain level. When sensor device 102a reports the temperature level to tracking center 104, an alarm or alert may be triggered to bring this information to the attention of personnel associated with tracking center 104. Tracking center 104, in turn, may alter the programming of sensor device 102a to check the temperature more frequently. One of ordinary skill in the art will appreciate that other parameters can be used as the basis for altering programming.

Clients 108a-108n provide users with an interface to network 106. By way of example, clients 108a-108n may be implemented using any device capable of accessing a data network, such as a general purpose computer or personal computer equipped with a modem or other network interface. Clients 108a-108n may also be implemented in other devices, such as a Blackberry™, Ergo Audrey™, mobile phones (with data access functions), Personal Digital Assistant ("PDA") with a network connection, IP telephony phone, or generally any device capable of communicating over a data network.

Clients 108a-108n may be utilized by users to request sensor data from tracking center 104. For example, a user may subscribe to a service that allows the user to access up-to-date information about one or more sensors. Alternatively, a subscription to a service is not necessary to access the information. In order to request sensor data, the user may enter information on client 108a indicative of the desired sensor data. For example, the user may enter information requesting the current location and temperature of all sensors within a certain radius of a specified sensor. After the customer enters this information, client 108*a* may send a request to tracking center 104, which in turn may search its database or request the information directly from the sensors. When tracking center 104 finds the requested information, it may send the information back to client 108*a*.

Sensor device 102*a* may be operable to periodically determine whether there are any sensor devices 102*n* within a certain proximity of sensor device 102*a*. When sensor device 102*a* determines that sensor device (e.g. sensor device 102*n*) is within its range, sensor device 102*a* may store information indicative of an association between the two devices. Sensor device 102*a* may also send this information to tracking center 104 via network 106. When sensor device 102*a* determines that sensor device 102*n* is no longer within its range, it may update the stored information resident at sensor device 102*a* and tracking center 104 to reflect that the devices are no longer associated with each other.

In addition to sending information to tracking center 104 regarding the association between sensor device 102*a* and sensor device 102*n*, sensor device 102*a* may also receive condition information from sensor device 102*n* and also transmit that information to tracking center 104. For example, if sensor device 102*n* does not have communication rights or the ability to communication with tracking center 104 (e.g. out of range), sensor device 102*n* may transmit condition information to sensor 102*a*, and sensor device 102*a* may transmit condition information of sensor device 102*a* and sensor device 102*n* to tracking center 104.

According to the above example, sensor device 102*n* may send condition information, or any other type of information, to sensor device 102*a* for subsequent transmission to tracking center 104. However, before sensor device 102*n* can transmit information to sensor device 102*a*, an energy management calculation may be invoked (e.g. automatically, at a scheduled time, or based on instructions received from tracking center 104) to determine that sensor device 102*a* has the needed battery power to fulfill its reporting requirements as well as reporting information received from sensor device 102*n*. If sensor device 102*a* has sufficient battery power, sensor device 102*n* may transmit information to sensor device 102*a* along with a temporarily issued communication right. This temporarily issued communication right may be sent to sensor device 102*n* from tracking center 104.

Sensor devices 102*a*-102*n* may also determine the location of other sensor devices. For example, sensor devices 102*a*-102*n* may listen for signals from other sensor devices that may be located in the vicinity of sensor devices 102*a*-102*n*. The signal may be a wireless signal periodically transmitted from one or more other sensor devices. In this manner, the one or more other sensor devices essentially periodically inform sensor devices 102*a*-102*n* that they are located in the vicinity of sensor devices 102*a*-102*n*. Upon receipt of the signal, sensor devices 102*a*-102*n* may use triangulation to determine the location of the one or more additional sensor devices. One of ordinary skill in the art will appreciate that devices 102*a*-102*n* may use other ways of detecting additional sensor devices.

Figure 2:
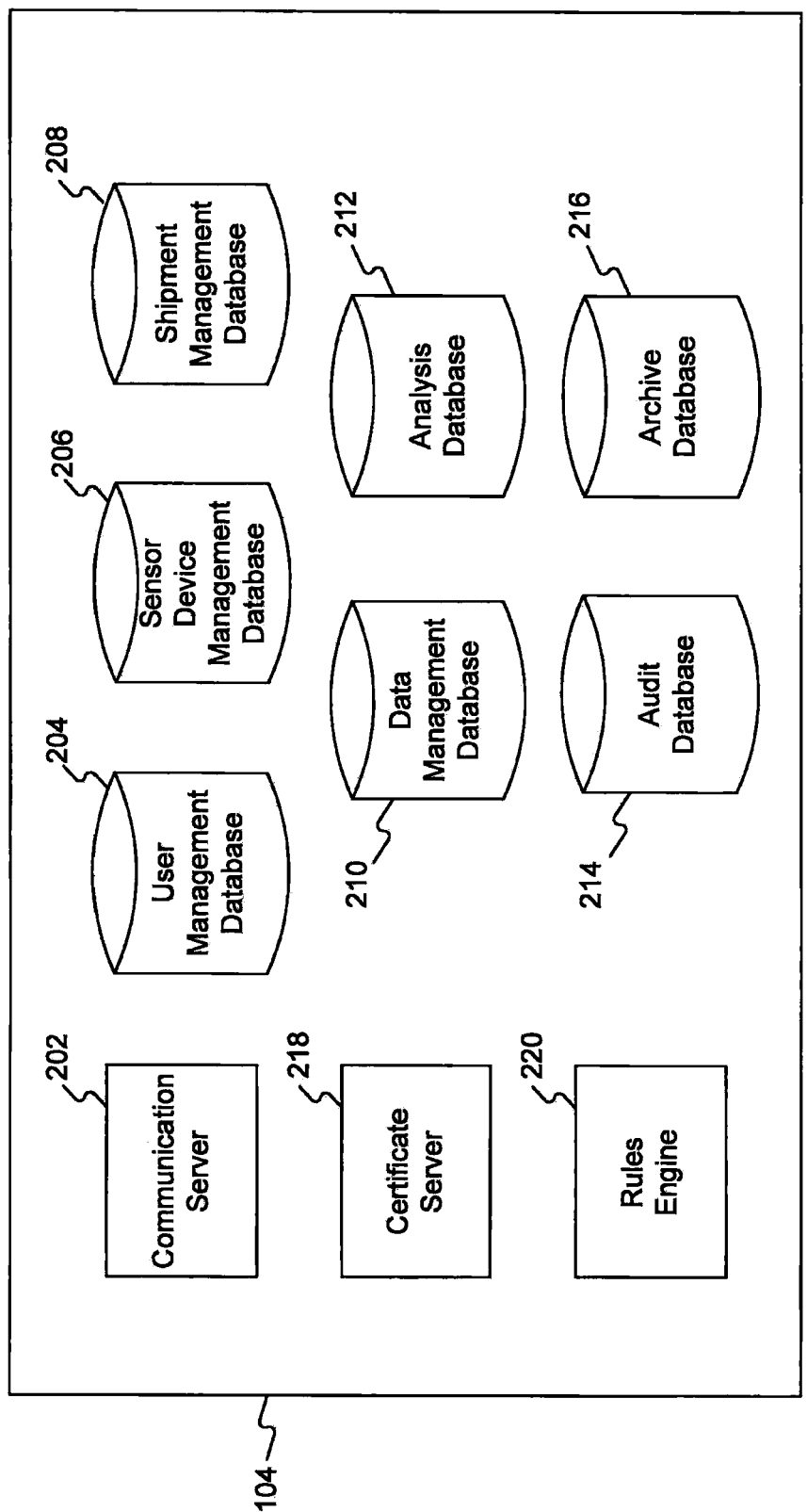
FIG. 2 illustrates an exemplary tracking terminal that can be used to implement embodiments of the invention.

FIG. 2 is a diagram of an exemplary tracking center consistent with the present invention. Tracking center 104 may include at least a communication server 202, a user management database 204, a sensor device management database 206, a shipment management database 208, a data management database 210, an analysis database 212, an audit database 214, an archive database 216, a certificate server 218, and a rules engine 220. The number of components in tracking center 104 is not limited to what is shown and other variations in the number of arrangements of components are possible, consistent with embodiments of the invention.

Communication server 202 may be a web server that provides functionality for receiving traffic over a network, such as the internet. For example, communication server 202 may be a standard web server that a user may access at client 108*a* using a web browser program, such as Safari, Internet Explorer, or Netscape Communicator. Communication server 202 is operable to receive requests for sensor data from clients, and pass the requests on to databases 204-216, certificate server 218, and/or rules engine 220 for processing. Communication server 202 may also send and receive messages for configuration, management, and monitoring of sensor devices 102*a*-102*n*.

User management database 204 may maintain a list of users of the system, user profiles, roles and permissions within the system, user organizations, and the relationship between users and/or other parties.

Sensor device management database 206 may maintain a per-party inventory of sensor devices 102*a*-102*n* used to provide monitoring information. Sensor device management database 206 may also store sensor data received from various sensor devices 102*a*-102*n*. Sensor device management database 206 may also store association information indicative of associations between sensor devices 102*a*-102*n*.

For example, sensor device 102*a* may periodically send sensor data to tracking center 104, where it is stored in sensor device management database 206. Exemplary sensor data may include location, temperature, light level, motion, pressure, humidity, acceleration, gas level, airflow, vibrations, or other environmental conditions. Sensor data that is transmitted to sensor device management database 206 may be accompanied by information identifying the sensor device 102*a*-102*n* that detected the sensor data.

Association data stored by sensor device management database 206 may also be periodically sent by sensor devices 102*a*-102*n*. For example, when an activated sensor device 102*a* becomes positioned within a predetermined proximity of another sensor device 102*n*, sensor device 102*a* and/or sensor device 102*n* may locally store information reflecting this proximity association. Sensor device 102*a* may then send tracking center 104 information indicative of the association. Additionally or alternatively, sensor device 102*n* may send tracking center 104 information indicative of the association.

When tracking center 104 receives a request for sensor data from client 108*a*, sensor device management database 206 may be searched for the requested data. If that data is found, it may be sent back to client 108*a*.

Shipment management database 208 may contain configuration parameters for one or more shipments. Data management database 210 may contain data generated by the monitoring of the shipments. This data may be augmented by other systems such as third-party package tracking systems and border-crossing systems (not shown).

Analysis database 212 may contain an aggregation of all system information for use in analyzing past activities, adjusting configuration parameters, defining new monitoring activities, and predicting future trends. Audit database 214 may contain information that allows parties to review the monitoring of shipments for conformance to regulations and quality metrics. Archive database 216 may contain information that provides long-term storage and access of historical data, and a communication sub-system that sends and receives messages for configuration, management, and monitoring to sensor devices 102a-102n and network 106.

Certificate server 218 may be operable to control access to data resident in sensor device management database 206. For example, client 108a or a user of client 108a may only be authorized to receive sensor data that corresponds to sensor devices 102a-102n. When that user requests a set of sensor data that includes data for which the client or user has no authorization to access, certificate server 218 recognizes the lack of authorization and only allows tracking center 104 to send the client or user the portion of the requested sensor data for which the client or user has authorization.

Rules engine 220 may be operable to, among other things, send queries to sensor device management database 206 based on requests for sensor data from client 108a, send requested sensor data to clients 108a-108n after receiving it from sensor device management database 206, process sensor data received from sensor devices 102a-102n, request sensor data from sensor devices 102a-102n, and alter the programming of sensor devices 102a-102n.

Figure 3:
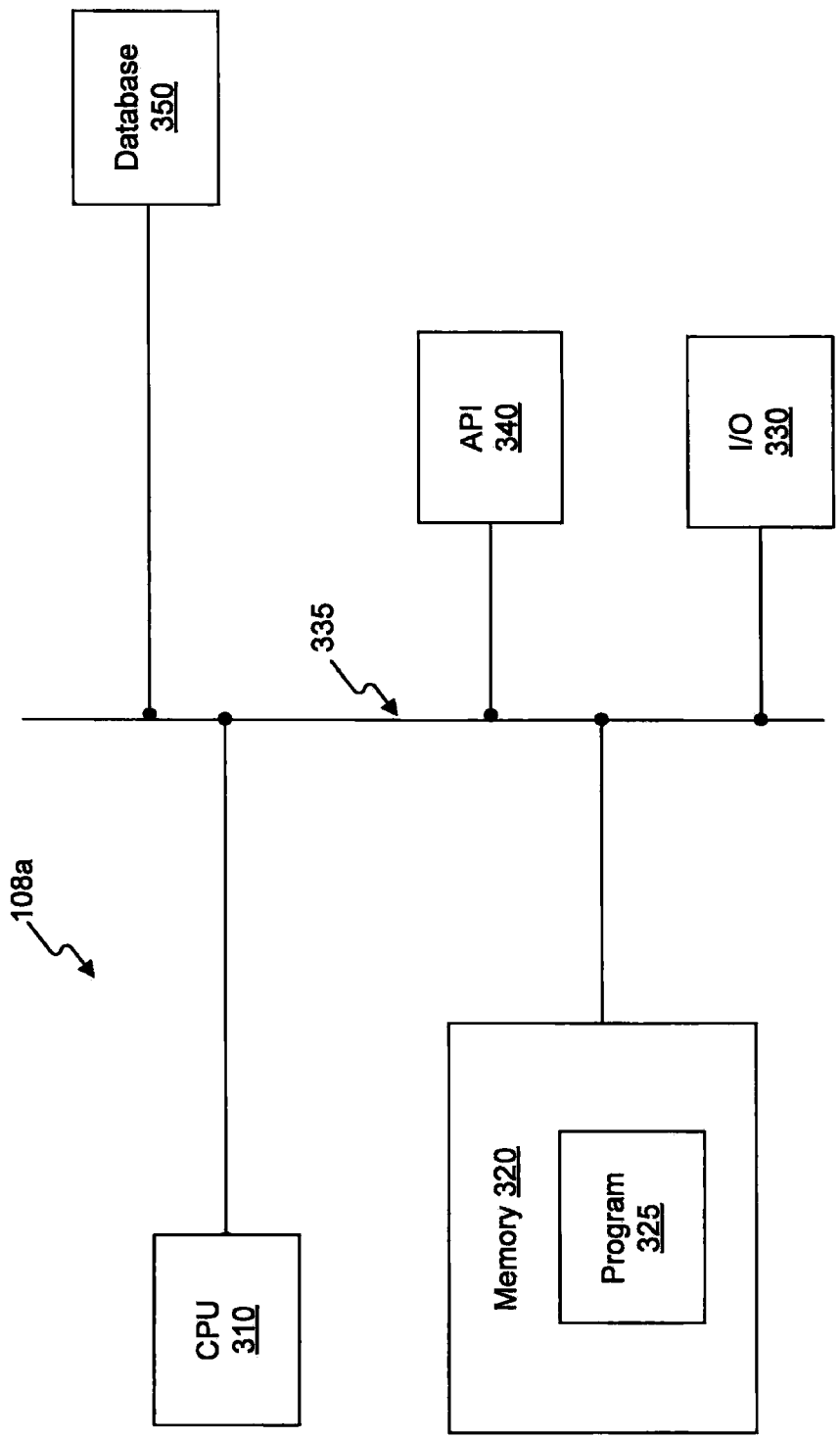
FIG. 3 illustrates an exemplary computing terminal that can be used to implement embodiments of the invention.

FIG. 3 illustrates an exemplary client 108a that can be used to implement embodiments of the invention. The components and arrangement, however, are not critical to the invention. One of ordinary skill will recognize that embodiments of the invention may be implemented by computers or workstations organized as shown, organized in a distributed processing system architecture, or organized in myriad suitable combinations of software, hardware, and/or firmware.

For example, client 108a may include components such as a central processing unit (CPU) 310, a memory 320, an input/output (I/O) device(s) 330, an application programming interface (API) 340, and a database 350 that can be implemented in various ways. For example, an integrated platform (such as a workstation, personal computer, laptop, etc.) may comprise CPU 310, memory 320, I/O devices 330, API 340, and database 350, interconnected by a local bus 335. In such a configuration, components 310, 320, 330, 340, and 350 may connect through a local bus interface.

CPU 310 may be one or more known processing devices, such as a microprocessor from the Pentium family manufactured by Intel™ or a mainframe-class processor. Memory 320 may be one or more storage devices configured to store information used by CPU 310 to perform certain functions, operations, and steps related to embodiments of the present invention. Memory 320 may be a magnetic, semiconductor, tape, optical, or other type of storage device. In one embodiment, memory 320 includes one or more software application programs 325 that, when executed by CPU 310, perform various processes consistent with the present invention.

Methods, systems, and articles of manufacture consistent with the present invention are not limited to programs configured to perform dedicated tasks. For example, memory 320 may be configured with a program 325 that performs several functions consistent with the invention when executed by CPU 310. Alternatively, CPU 310 may execute one or more programs located remotely from client 108a. For example, client 108a may access one or more remote programs that, when executed, perform functions related to embodiments of the present invention. The configuration and number of programs implementing processes consistent with the invention are not critical to the invention.

Memory 320 may be also be configured with an operating system (not shown) that performs several functions well known in the art when executed by CPU 310. By way of example, the operating system may be Microsoft Windows™, Unix™, Linux™, an Apple™ operating system such as MAC OSX™, Personal Digital Assistant operating system such as Microsoft CE™, or other operating system. The choice of operating system, and even the use of an operating system, is not critical to the invention.

I/O device(s) 330 may comprise one or more input/output devices that allow data to be received and/or transmitted by client 108a. For example, I/O device 330 may include one or more input devices, such as a network connection, keyboard, touch screen, mouse, microphone, disk reader, and the like, that enable data to be input or received from a user. Further, I/O device 330 may include one or more output devices, such as a network connection, display screen, printer, speaker devices, and the like, that enable data to be output or presented to a user. The configuration and number of input and/or output devices incorporated in I/O device 330 are not critical to the invention.

API 340 is an interface used by client 108a to execute user requests. API 340 may be used in conjunction with I/O device 330 to define, for example, monitoring parameters, events, and notifications with respects to shipments. In addition, API 340 may query and receive information regarding shipments in response to information received at I/O device 330. API 340 may also update information stored in databases 204-216.

Database 350 may comprise one or more databases that store information and are accessed and managed through system 100. By way of example, database 350 may be an Oracle™ database, a Sybase™ database, or other relational database. As illustrated in FIG. 2, databases 204-216 may located within tracking center 104. However, the information stored in databases 204-216 may also be located in database 350.

Parties

According to one embodiment, a "party" may refer to an individual, a group, a division, a company, or any combination of individuals, groups, divisions, or companies. For example, when a user sends or receives a shipment, the user may join system 100. When the user joins, the user may enter his company name, and a party corresponding to the company may be created. After creation of the party, the user may be assigned to the party. When other users that belong to the same company join system 100, they may also be added to the party.

A party may use system 100 to collaborate with other business partners. To do so, the party may either identify other parties already present in the system via a search feature, or they can invite users into system 100. New parties may create collaboration profiles that specify their default policies for sharing information and access to their sensor devices. In addition, parties may also change their profiles at any time. For example, a party may change their profile on a per-shipment basis or may create profiles specific to one or more business partners. Collaboration profiles contain rules that may be invoked against a permission mechanism to enable and restrict access by business partners to information defined or created by other parties.

For example, a party may choose to make information about all of their monitored shipments available to all other parties in the system. Conversely, a party may restrict access to each monitored shipment to only the parties participating in the shipment (e.g. recipient and carrier). This may prevent other parties from accessing the information. The system also contains a mechanism used to govern the amount and level of detail of information access on a per-user basis; this mechanism is discussed further in this document.

The system may also allow the creation of communities of parties which cross organizational boundaries. To do so, users may search for other parties by name, description, or by settings in their collaboration profile that may indicate organizations willing to cooperate in fulfilling some need, such as providing intervention services to assure shipment integrity. To aid the collaborative process, party profiles may include information about the duration of a party's membership in the system and reputation information as expressed by their fellow members. The party profiles may also include operational information, such as the certificates or other configuration information necessary to leverage their telecommunications or computer networks. By granting access to their networks, a party may allow other parties to use them to transmit and receive monitoring and system data.

Permissions

System 100 may also include a permission mechanism that may be used to implement a set of permissions that grant or deny parties the ability to perform actions related to sensor devices 102a-102n and databases 204-216. The permission mechanism may be implemented by certificate server 218. For example, each party may have access to administrative functions that may include defining new parties in the system, adding or removing sensor devices 102a-102n, and/or the restricting or permitting access to party shipment information by other parties. Accordingly, permissions may allow a party to grant administrative functions to other parties, such that a party can, for instance, define a set of parties and restrict their ability to view, create, or update sensor devices 102a-102n, or to create, view, or update one or more shipments or sets of shipments.

This permission mechanism may be used to implement a set of collaboration policies within the system. Organizations, users, devices, shipments, and information stored within the system are created, viewed, modified, and deleted according to rules that take into account the object of the action and the entity performing the action. Rather than exhaustively specify the ability or inability of all other parties to perform such actions, these permissions can refer to roles that imply group membership (e.g. the set of all users belonging to a certain organization, all members of all organizations, all shipments in which a particular organization is a party, etc.). This system allows shared access to information and enables parties to act on this information. Parties collaborate by either actively seeking permission to access and act on data or by being passively granted permission by default. Collaboration policies specify what the default roles and permissions are for entities in the system.

Sensor Device

As previously stated, sensor device 102a may be placed inside a package with the contents of the package. Sensor device 102a may measure or detect one or more conditions such as location, temperature, light level, motion, pressure, humidity, gas level, airflow, vibrations, or other environmental conditions.

Sensor device 102a may report data in several different ways. For example, sensor device 102a may report data based on measurements of at least one of physical quantities (e.g. temperature of 72° F.), qualitative assessments (e.g. "hot"), relative observations based on a predetermined threshold (e.g. greater than 85° F.), a calculated threshold (e.g. average greater than 80° F.), and business-events provided by third-party systems (e.g. proof-of-delivery of a shipment). This data may be correlated with the shipment and may be used to report any changes in shipment status or a lack of changes in the status.

Depending upon the capabilities of sensor device 102a, these measurements may be calculated directly by sensor device 102a. However, other measurements may be calculated based on party requirements entered at I/O device 330 and processed by API 340. According to one embodiment, all observations are confirmed by API 340 because different measurements may be of interest to different parties. For example, a shipping party may wish to know when sensor device 102a measures the presence of 50% relative humidity. However, a receiving party may wish to know when sensor device 102a measures the presence of 80% relative humidity. If sensor device 102a cannot be configured to report against multiple measurement thresholds, then API 340 may be responsible for performing these calculations.

Parties with sufficient permission can define new sensor devices 102a-102n within the system by creating a sensor profile. A sensor profile may include a list of monitoring capabilities of sensor device 102a that may describe the conditions that sensor device 102a may observe (e.g. temperature, humidity, location, movement, etc.), the frequency that sensor device 102a may make observations, and the frequency that sensor device 102a reports the observations.

Sensor device 102a may be "owned" by a party because a party may govern access to data even if access is currently unrestricted. For example, some websites may publish weather information by ZIP code. This weather information may be correlated with temperature readings from another sensor device 102a to warn one or more parties of weather conditions. In this example, access may simply be the availability of the website to respond to requests.

In another embodiments, sensor device 102a may be "owned" by a party to the shipping process (e.g. a shipper, recipient, carrier, or logistics provider). In this embodiment, the sensor profile would indicate sensor device 102a ownership and allow that ownership to transfer to a different party upon completion of use. For example, a shipper might use sensor device 102a to assure the integrity of a high-value merchandise to a recipient. Upon proof of delivery to the recipient, the shipper may automatically transfer ownership of sensor device 102a to the recipient. Conversely, a different shipper might want retain ownership of sensor device 102a and this shipper may not transfer ownership of sensor device 102a to the recipient. A shipper may not transfer ownership so that the shipper would be able to use sensor device 102a to aid in a return of defective merchandise.

Some sensor devices 102a-102n may support inter-device communication using short-range communication mechanisms such as ZigBee. These sensor devices 102a-102n may use this capability to support business-level activities, such as ensuring the integrity of a set of shipments by mutual visibility and communication. Sensor device 102a owners may also allow shared access to this feature by other sensor devices 102n, particularly sensor devices that are owned by other parties. Sensor devices 102a-102n with networking capability may also transmit their observations using other sensor devices as communication gateways.

The system may also support profiles describing static (e.g. fixed) and configurable sensor devices 102a-102n. Via API 340, the system may define mechanisms and messages that may be used to configure sensor devices 102a-102n. These messages may include information used to identify the sensor device 102a that is the subject of the message and parameters to define thresholds for measuring observations, reporting observations, and reporting frequency.

Whenever possible, sensor profiles include a description of the power requirements over time of particular monitoring functions, such as the use of a GPS sensor to determine location. When provided, this information can be used to estimate the total power usage over a set of monitoring functions, and this information may be used to estimate the maximum duration of monitoring by sensor device 102a and may be used to assist a party in defining monitoring parameters. If this information cannot be provided, but sensor device 102a can provide diagnostic information specifying the power usage or level over time, historical data may be used to estimate the power requirements for particular sets of commonly used monitoring parameters.

Depending upon the capabilities of sensor device 102a, additional messages can be sent to sensor device 102a providing power and cost management information. This information may include time or location-based periods during which sensor device 102a functions may be reduced in frequency or idled, or during which communication can be restricted or switched to lower cost channels.

These messages may be sent during the initial receipt and setup of sensor device 102a as part of an inventory management function. These messages may also be sent during configuration of sensor device 102a dedicated to a specific kind of transport, storage, value chain production, or other logistics function. Sensor device 102a configuration can be a one-time activity or real-time, dynamic activity reflecting changing conditions or needs of system users or in response to system calculations.

Sensor Device Configuration

The permission mechanism may govern access to particular sensor devices 102a-102n on a per-user basis, and the permission mechanism may also provide the ability to configure sensor devices 102a-102n. This configuration information may consist of specifying which capabilities should be used in monitoring information of a particular shipment (e.g. movement, temperature, and humidity) in addition to the actual observation and reporting frequency to employ when providing information. This configuration information may be transmitted to sensor devices 102a-102n via a device configuration system (not shown). Device configuration system may use an intermediate communication gateway as needed to communicate with sensor devices 102a-102n. Alternatively, sensor devices 102a-102n may be configured by a plug-in connection to a programming device, such as a PC having a computer-readable media reader.

After configuration, sensor device 102a may transmit information to a data receiving system which may record the data and make that data available to parties with sufficient permission to view the data. The data may also be passed to a notification system that may compare the data against monitoring parameters. The notification system may also perform further actions, as needed, based on the result of the comparison. These actions may include triggering external system activities, performing calculations that result in new configuration information being sent to sensor device 102a, performing calculations that result in new configuration information for use in further monitoring, and correlating data from sensor devices 102a-102n or historical data. The system may also supplement data provided by sensor devices 102a-102n with information provided by the carrier or other external systems, either by receiving messages via the API or by querying these systems for data. This information may be viewed as third-party information and it may be combined with the sensor information and presented to the appropriate parties.

In addition to configuring a single sensor device 102a, the system may also transmit future configuration parameters for storage on sensor device 102a based on the capabilities of sensor device 102a. For example, if the monitoring frequency of sensor device 102a should change during shipment to allow more precise monitoring of its location as it nears a destination of the recipient, these parameters may be sent to sensor device 102a and sensor device 102a may automatically modify the reporting configuration.

Sensor device 102a configuration and access to data may be defined either collaboratively or on a per shipment basis. For example, in a particular shipment, both the shipper and the receiver may want to define monitoring parameters that may not be consistent. One way to accomplish this may be to use two sensor devices 102a and 102b, where sensor device 102a provides data to the shipper and sensor device 102b provides data to the receiver. However, using two sensor devices is not efficient. Therefore, rather than using two sensor devices to monitor and transmit data, the shipper and the receiver may share a single sensor device 102a.

Rules may be defined within the system that limit or force the shipper and the receiver to negotiate the implemented monitoring configuration parameters. The system can allow the shipper and the receiver to be effectively unaware that sensor device 102a is being shared. This may be accomplished by restricting the data available to the shipper and the receiver by events and thresholds defined by each party. For example, a receiver may desire location reporting at city-level at half-hour intervals, and the shipper may desire address-level reporting at hourly intervals. Sensor device 102a may be configured to report address-level reporting at half-hour intervals, but each party would only see information at the requested level (e.g. address vs. city) and requested frequency (e.g. half-hour vs. hour).

According to another embodiment, a shipper may define the reporting configuration of sensor device 102a to restrict the receiver from viewing data regarding the shipment to certain locations or during certain times. In addition, the configuration of sensor device 102a may also permit the receiver to view all data of the shipment once it has entered within a certain radius of the delivery location.

As previously stated, parties may define a shipment within the system. Examples of shipments may include the delivery of goods, the return shipment of any sensor device 102a and/or goods to the shipment origin or other location, the shipment of multiple items from a common origin through common intermediate points to multiple independent destinations, the aggregation of multiple shipments from separate origins to a common destination, and combinations of these scenarios.

These events may range from simple matching (e.g. the temperature of sensor device 102a has reached a certain threshold) to complex chains of independent or related events (e.g. a shipment has moved after 5 PM on certain day and the temperature and humidity have not exceeded a certain threshold after 20 minutes of movement). Since the specification of these events may be limited based on the capabilities of sensor device 102a, the system may prevent parties from attempting to specify events that cannot be provided by sensor device 102a. A party that owns sensor device 102a may modify the device's profile to limit the volume of monitoring observations provided to other parties. The party may also limit the specificity of data provided and the frequency of data reporting by specifying a delay before another party may view or interact with data from sensor device 102a.

A party may also only partially specify the configuration information for later use. This configuration information may act as a template where certain values may be specified, such as the origin of the shipment, the type of sensor device 102*a* to use for monitoring the shipment, and the type and frequency of monitoring data to collect. While this information may be specified during configuration, one of ordinary skill would appreciate that this information may be modified by the party during shipping.

Parties may also define relationships between shipments, such that two or more shipments originating from different locations and traveling to a common destination may be defined and queried by API 340 and viewed via UI 330 as a group. Likewise, multiple shipments traveling together from an origin to destination may be similarly grouped, and multiple shipments starting from a common point but ultimately arriving at more than one destination may be similarly grouped. This association of shipments may allow the party to define common configuration parameters across the group and may also simplify viewing, updating, and other operations. Multiple shipments may also be aggregated to provide a "safety net" feature. A "safety net" feature may be preferable when tracking shipments because this feature may reflect multiple activities, locations, and other monitoring data. Moreover, too great a variance in any of these data parameters could be used by a party to determine an error in the logistics process.

For example, a shipment of goods may be sent from three different plants A, B, and C and may all travel to a common intermediate point D (e.g. an assembly plant). Intermediate point D may ship the entire shipment of goods to a distributor E, and distributor E may separate the goods into three different shipments sending the goods to a return location F, a warehouse G, and a warehouse H. After return location F, warehouse G, and warehouse H receive the appropriate shipments, return location F may send the shipment back to plant A. In addition, warehouse G may send the shipment to a retailer I, and warehouse H may keep the shipment.

When defining common destination of multiple shipments, the system may optimize the use of sensor devices 102*a*-102*n* to meet the monitoring requirements of different parties while also minimizing the number of sensor devices 102*a*-102*n* in use. Optimizing the use of sensor devices 102*a*-102*n* may also minimize the overall power used by sensor devices 102*a*-102*n* and the aggregate number of communications required to report the status of the shipments. While the above examples have explained the use of a single sensor device 102*a* to monitor several shipments, one of ordinary skill would appreciate that a party may choose to monitor a single shipment using multiple sensor devices 102*a*-102*n* to ensure monitoring parameters by calculating information from each of sensor devices 102*a*-102*n* or performing more sophisticated analysis based on known capabilities, accuracy, and precision of sensor devices 102*a*-102*n*.

According to another embodiment, sensor devices 102*a*-102*n* may each be placed in separate packages for shipping and may travel together when each of the packages is transported as a group (e.g. cartons on a pallet). In this embodiment, sensor devices 102*a*-102*n* may be configured to determine a master sensor device 102*a* that may receive information from other sensor devices. Based on this configuration, sensor devices 102*a*-102*n* may all communicate with each other, but only sensor device 102*a* transmits information to tracking center 104.

Sensor devices 102*a*-102*n* may also be configured to opportunistically take advantage of third-party communication networks, such as WiFi networks. Sensor devices 102*a*-102*n* may sense and report third-party communication networks that may provide compatible communication channels during transport back to tracking center 104. If these channels are open for communication, sensor devices 102*a*-102*n* may use them if other preferred channels are not open or if they can be used to reduce power consumption and/or cost. If these networks belong to parties in system 100, a party with sufficient permission may view these networks and obtain appropriate credentials to enable the use of these networks. If the credentials are approved, the information regarding these networks may be sent and downloaded by sensor devices 102*a*-102*n*.

Databases 204-216 may act as a feedback mechanism for sensor devices 102*a*-102*n*. Based on data transmitted from sensor devices 102*a*-102*n* to the databases 204-216, information derived from sensor devices 102*a*-102*n* either alone or in combination with information from other sensor devices 102*a*-102*n*, information derived from third party systems, or historical information from sensor devices 102*a*-102*n* used in monitoring similar shipments (e.g. matching the origin and destination of a current shipment or matching the shipper and recipient), system 100 may transmit new or updated configuration parameters to sensor devices 102*a*-102*n*.

For example, if system 100 notices that the temperature reported by a sensor device 102*a* is trending upward, system 100 may reconfigure sensor device 102*a* to increase the rate and/or precision of temperature measurement and reporting based on the capabilities of sensor device 102*a*. This ability to reconfigure sensor device 102*a* is especially important if a party indicated that the temperature should be monitored and sensor device 102*a* should provide information if the temperature is approaching a critical threshold. System 100 may also use historical measurements to detect anomalous events. For example, an average transit time from origin to a particular mid-point may be 15 hours with a standard deviation of an hour based on historical data. However, a particular shipment may taking longer (e.g. 17 hours). If this occurs, parties monitoring the shipment may be alerted even though the parties had not requested notification of such an event in advance. Historical data may also be used to determine unusual data, such as delays in movement that might be the result of an accident.

In addition to monitoring shipments, system 100 may use historical information to modify existing shipments and/or plan future shipments. For example, if stored condition information indicates that shipments being routed through Phoenix in the summer experience increased temperature and vibration, the shipper may use this information to adjust routing habits. Instead of routing a package from Memphis to Los Angeles through Phoenix, the shipper may instead route the package from Memphis to Los Angeles through Minneapolis. In addition, system 100 may use condition information to avoid other locations along the route based on additional seasonality conditions that may interfere with the integrity of the shipment. System 100 may route a shipment that is currently in route and may also use condition information to modify future shipments to avoid certain areas or zones.

By using historical condition information received from one or more sensor devices over a period of time, the parties may be able to avoid known locations that may present challenges to the shipping process. In addition to seasonal conditions, historical information may also provide the parties with information regarding country specific rules, such as encryption rights and regulations of different countries or zones. For example, if a shipment is being set to China, China may have different encryption rights and regulations. Based on past shipments, system 100 may determine the encryption rights and regulations of China, and tracking center 104 may send instructions to sensor device 102*a* to reconfigure the encryption rights of sensor device 102*a* to meet the new requirements. This reconfiguration may be done in real-time as the shipment enters China. A further description of real-time monitoring is discussed below. In addition to real-time reconfiguration, system 100 may use encryption rights and regulations to modify to configuration of sensor device 102*a* before shipment.

Sensor device 102*a* may also transmit other data to system 100 even though this data might not be individually identifiable or actionable. For example, sensor device 102*a* may report the number and type of observations they have made using standard or custom units of measure (e.g. observations per hour). This data may be transmitted in the same manner as other sensor data. However, the party that currently "owns" sensor device 102*a* (e.g. the party that is authorized to control sensor device 102*a*) may choose whether this data is stored with the other data. If it is, the party may, based on the party profile, make this data available to other parties both during shipment and afterwards as historical data.

Parties may record information about communication networks, such as WiFi or other wireless networks, for use by sensor device 102*a* for sending and receiving monitoring and other system information. This information may include the location of wireless access points or other communication gateway devices, security credentials, certificates, and other security information necessary to use the network. This information may also include specifications regarding limits on the amount of data that can be transferred by parties over the network, the duration of use within certain timeframes, and other information necessary to ensure proper use.

For system 100 to report the information about a shipment, an association may be made between the sensor device 102*a* that is monitoring the shipment and a shipment identifier. This would typically be done at the time the shipment is created when a tracking number for the shipment is generated and the package is ready to be sealed. This process may occur at I/O 330 where the party may input or select a unique sensor identifier and a shipment identifier. The sensor identifier can be any unique number such as the hardware ID, SIM card number, or the device phone number. The shipment identifier can be the tracking number, freight shipment number, customer order number, or any unique identifier for that package. A sensor device 102*a* may also be associated with groups of individual shipments or consolidated packages traveling together under one shipment, such as a pallet. Likewise, multiple sensors devices 102*a*-102*n* may be associated to a single shipment if, for example, battery life of one of sensors devices 102*a*-102*n* is inadequate to cover the entire route.

The association may also take place prior to the time a shipment is ready to be sent. This may occur if the shipper wants to monitor conditions during manufacturing or assembly but shipment details for the product have not been determined yet. In this example, the association could be between at least one of sensors devices 102*a*-102*n* and the shipper's internal order identifier. After the order has been completed and prepared for shipment, the shipment number could be added to the shipment to complete the associations. A similar process may also occur when monitoring a product after the end of a shipment.

The shipper may also define a termination point of the shipment (e.g. at the recipient). When the shipment arrives at the termination point, the association between sensor device 102*a* and the shipment identifier would cease. At this time, sensor device 102*a* may be available to be associated with another shipment. One of ordinary skill would appreciate that the termination point may be negotiable between the shipper and recipient if the detailed information about the shipment is of interest to both parties.

Real-Time Monitoring

After an association occurs, sensor device 102*a* may report data on a periodic basis, and this data may be available to the appropriates parties via I/O 330. This data is presented as a set of information about that shipment and may include, for example, multiple environmental elements, location, progress of the shipment, and overall status. This information may be presented graphically, in table format, or via a map view.

The timeliness of the data is contingent both on network availability and latency. When cellular backhaul is the sole communication method, data availability may be impacted by network conditions. Short range communication options such as WiFi and Zigbee are also a possibility and may be used as either a primary transmission method or a secondary transmission method. When communication with a network is not possible, the data received by sensor device 102*a* may be logged and stored in sensor device 102*a* and transmitted when communication is available.

In addition to specified monitoring parameters (e.g. location, temperature, and humidity), sensor device 102*a* may also transmit other data as part of the monitoring information. This data may be transmitted to system 100 via messages, and the message formats and receiving mechanisms may be specified by API 340 via I/O) 330. This data is stored as part of the monitoring information and is accessible to all parties having access to the shipment data.

The monitoring frequency may be determined by the party at the start of the shipment and may differ from the communication frequency. These frequencies may also be altered during the shipment if two-way communication with sensor device 102*a* is available. During monitoring, if sensor device 102*a* recognizes that its data storage space is limited, sensor device 102*a* may be configured to cease monitoring, reduce the frequency of observation, begin overwriting past observations, calculate new observations that attempt to summarize the values of previous observations (e.g. the average temperature over multiple observations and location based on a set of latitude/longitude locations), or any combination.

Parties may also choose to view the information generated during the monitoring of a shipment using filters that limit or narrow the type and number of observations presented. For example, a party may choose to view information generated or calculated during a specific time period, or a party may chose to only view information that meets criteria such as a measurement being above a threshold value. Moreover, parties may also view lists of shipments, inventory, or other monitored goods using these same criteria. Parties may sort and filter these lists, which may provide for separate viewing of information regarding, for example, shipments that are in motion and shipments that have generated a notification.

Sensor device 102*a* may also be used to observe the status of a package both before and after the shipping process. For example, sensor device 102*a* may monitor the status of a package stored in a warehouse after manufacture or in a distribution center after delivery. This is useful for performing asset or inventory management. Monitoring a package after shipment may require additional configuration parameters, such as a delivery event notification via a third party API or manual intervention by the third party to determine when the monitoring period begins.

For example, a third party system may be a warehouse management system that tracks the arrival or departure of shipments from a facility. This information may be used as another source of shipment status (e.g. shipped, received) or as indication of location if GPS or other location sensors could not work due to building interference or other factors. Another example of a third party system may be a temperature monitoring system within a building that provides an network-accessible source of information regarding the temperature and humidity status of a room. This information may provide additional information (e.g. ambient environmental condition) or as a correlation factor in confirming the condition of a shipment.

When a third party system is used to provide monitoring information, this information must be correlated with other monitoring information and/or the shipment. For example, if the shipper uses a carrier with shipment tracking service, the tracking service may report information based on a shipment tracking number, rather than sensor device 102a. Accordingly, when a third party system is used as a data source to provide additional information, the information may be transmitted to system 100 along with the shipment tracking number so that the information from the third party system may be correlated with the shipment.

Events and Notification

As appreciated by those of skill in the art, the monitoring process may include an active notification of parties or systems in response to a change in the status of a shipment. Notifications may be generated by system 100 based on the information collected by the sensor devices 102a-102n or based on non-sensor activities. These notifications may include a notification of new data that may include a signal indicating an alert condition (e.g. change in light, temperature, humidity). The timely departure from pre-defined location may generate a geofence notification (e.g. movement in or out of a specified area) whereas a temperature sensor reading exceeding the defined thresholds may trigger an environmental alert. These messages may be transmitted to the appropriate party or parties using multiple methods depending on the severity of the message. Notifications may be presented to the appropriate party or parties via email, Short Message Service (SMS), display on I/O 330, and presentation to a third party system via mechanisms specified by the appropriate party.

When defining a shipment, a party may specify start, intermediate, and end points based on either static or dynamic criteria. For example, a recipient may define the origin of a shipment as an address or a geofence boundary enclosing a particular area. In addition, the recipient may define the destination as the region "30 minutes" from a delivery address, where the "30 minute" boundary would be determined during shipment by the speed of sensor device 102a, a vehicle containing the shipment, or some other mechanism. Start, intermediate, and end points may be defined using simple criteria, such as a reading from a clock, or by combining multiple criteria in complex ways. For example, the start of a shipment may be described as the movement of sensor device 102a after a certain time. The definition of any of these conditions may be specified as requiring all of them (a logical AND), any one of them (logical OR), as following a pre-defined sequence of occurrence, or as the lack of an occurrence within a specified time window (logical NOT). The intermediate points may represent logistics process steps, such as distribution or manufacturing locations, or time periods where particular readings are expected.

Arbitrary regions may be also be defined by applying restrictions on shipment data visibility. For example, a carrier may wish to restrict visibility to its shipping network. Therefore, the carrier may define regions covering its facilities or time periods covering modes of shipment. These regions may be defined independent of any particular shipment and may then be applied to individual shipments or set as a default setting applying to all shipments that meet certain criteria.

Environmental thresholds and location boundaries may also be stored on sensor device 102a and would not require activity from system 100. Sensor device 102a may also alter its monitoring or reporting activity based on sensor data or location information. Other triggers for alerts may include movement as detected by sensor device 102a, a schedule as calculated by system 100, or carrier information.

Alert settings for an individual shipment may be applied at the beginning of shipment and may be modified remotely by the party or automatically adjusted based on conditions detected by sensor device 102a. System 100 may use these alerts to control monitoring as well. For instance, if a shipment is received at a customs clearing location and requires additional confirmation, sensor device 102a may detect that the shipment is not moving and may transmit that information to system 100. Based on this information, system 100 may re-configure the sensor device 102a to reduce power consumption, thus extending the monitoring ability of sensor device 102a in an effort to guarantee that sensor device 102a can still fulfill monitoring requirements once the shipment passes customs. If other shipments have sensor devices 102a-102n that monitor the package through customs, historical monitoring data may be used to estimate the duration of this period. This may result in a more accurate reconfiguration and may provide interested parties with information to better describe the logistics process.

Alert notifications to parties and system 100 may be configured to require an acknowledgement of receipt. Notifications that are not acknowledged within a pre-configured timeframe may automatically transition their recipient to other parties or trigger other actions such as executing rules, generating other notifications, and sending messages to other systems.

Data

Aside from monitoring data, parties can choose to store other unstructured data in data management database 210. This data may include documents representing agreements between parties, reports covering shipments, shipment documents such as bills or proof of delivery, sensor device 102a proof of ownership, and other information useful in the logistics process. This data is subject to the same collaborative sharing access rules as other information stored in data management database 210.

Archive

The information gathered and calculated during the monitoring of shipments (e.g. historical data) may be available to the party that configured the monitoring parameters for a configurable period after the monitoring ends. The duration of the configurable period is set by a party in system 100 with sufficient administrative permission. If multiple parties are collaborating in the monitoring of a shipment, all parties can view and interact with this information for the defined period. At the end of the defined period, the information may be archived in archive database 216. When the information is archived, the shipment information and its associated data does not appear in any lists presented by I/O 330. Accordingly, archived data may be considered hidden from view. Parties may choose to prevent one or more shipments from being archived. In addition, parties may manually choose to archive shipments before system 100 would automatically archive the information or after having chosen previously to not archive the information. Archive database 216 may also aggregate all archived data for use in analysis by parties.

Historical data may also be used to create shipment "templates." For example, when a shipper is configuring a shipment, the shipper may input numerous data elements (e.g. destination, carrier, etc.). However, some data elements may not be known until the shipping order is created (e.g. tracking number or date specific service levels like Saturday delivery). Accordingly, the shipment template, which is a named shipment configuration that has at least one of the shipment configuration elements input, may be missing data elements. Rather that spending the time and resources to recreate a shipment template, it may be easier to start with the configuration of a past, successful shipment and adjust or remove data elements as appropriate to adjust for other shipments that fit the intended profile. Alternatively, an automated process could cluster past, successful shipments based on configuration similarities to the shipment selected and assist the party by flagging the configuration values that are likely to require attention for a particular shipment.

By way of example, a shipper may notice that most shipments to a receiver are almost identical, and a data element corresponding to the carrier may depend on how quickly the receiver requires the shipment. Therefore, the shipper may create an shipment template based on a previous shipment, and the shipper may flag the carrier as unspecified in the shipment template so that the shipper may be required to set the carrier when he creates a new shipment.

According to another example, a shipper may have a new employee that may create a new shipment template for a shipment to a receiver. The employee may choose the wrong carrier. System 100 may access the historical data stored in archive database 216, and system 100 may notice that this shipment template is very similar to previous shipments, but the carrier has never been used before for this type of shipment. The shipper may then be prompted for confirmation that the carrier is correct. In response, the shipper may correct the mistake or, if he decides that the carrier is correct, he could confirm the selection.

In addition, access to historical data provides parties with the opportunity to detect deviations from specified monitoring parameters and to infer and suggest better parameters, such as more precise thresholds or more accurate location and time values. For example, a receiver may notice that a geofence describing the delivery destination encloses his entire distribution center, an area covering 15 acres. The historical data may indicate that the monitoring of the shipments ends within a much smaller area (e.g. several hundred square feet). The receiver may then update the parameters used to create new shipments with this smaller region. In addition, the carrier for these shipments may also realize that all shipments delivered to a particular address end up being delivering to a particular receiving dock location. The carrier may update their parameters to reflect this information.

Having access to historical data allows the opportunity to characterize recurring problems in similar shipments either by manual inspection or automatic data mining. For example, if a shipper is examining past shipments, he may discover that the percentage of packages above a predetermined temperature threshold increases during a certain time of year for ground shipments but not for express shipments. This information may alert the shipper to, for example, investigate if seasonal packaging with additional insulation is cheaper than simply switching the service level to express.

Analysis

In addition to viewing party data, sensor device 102*a*, and shipment data, parties may also have access to historical data stored in analysis database 212. Subject to access permissions, parties may analyze current and historical data. For example, parties may view an aggregate depiction all of their organization's shipments. When other organizations create and monitor shipments, this data is also available for analysis, although these organizations may specify that their data is not identifiable. This may result in analysis database 212 replacing organization names and other identifiers with unique, generic values.

In addition to using GPS technology, the parties may also use Assisted GPS (A-GPS). A-GPS enhances the startup performance of a GPS satellite-based positioning system. In order to take advantage of A-GPS services, a receiver needs to have a general idea of its current position and a confidence interval that describes the confident the receiver has in knowing its current position. This allows the A-GPS service to determine what satellites the GPS receiver should be able to see, thereby allowing the receiver to avoid wasting resources searching the spectrum for satellites that are not currently visible to its location. Whenever a sensor device 102*a* sends a GPS position to an application, a cell base station that is associated with sensor device 102*a* is recorded along with identifying information for any other cell base station that is "visible" to, that is within some of sensor device 102*a*. Since the upper limit on cell size is known, it is possible for the application to calculate positions and confidence intervals for sensor device 102*a* using historical position data.

In order for this to occur, the application may build a graph using previously seen cell sites as points (nodes) and creates edges (lines) between points that have been reported as visible to sensor device 102*a* at the same time. For example, if sensor device 102*a* is associated with cell A but can also see cells B, C, and D, then the points for A, B, C, and D are all connected to each other by graph edges. Once the graph is created, a table may be created by visiting each point in the graph and determining how many edges must be traveled from the given point to the nearest point that has had a valid GPS reading associated with it. The confidence interval may then be calculated by adding one half to the number of edges traversed and multiplying the result by the expected cell diameter. If multiple GPS associated points are equidistant from the current point, the GPS readings may be averaged.

When sensor device 102*a* first connects to the application, the application may access the information based on the cell sites currently visible to the sensor device 102*a*. If any of the visible cell sites have been previously seen and associated with a GPS reading, the application may use the calculated position and confidence interval as the seed position and confidence interval required by the A-GPS service.

Flowchart

Figure 4:
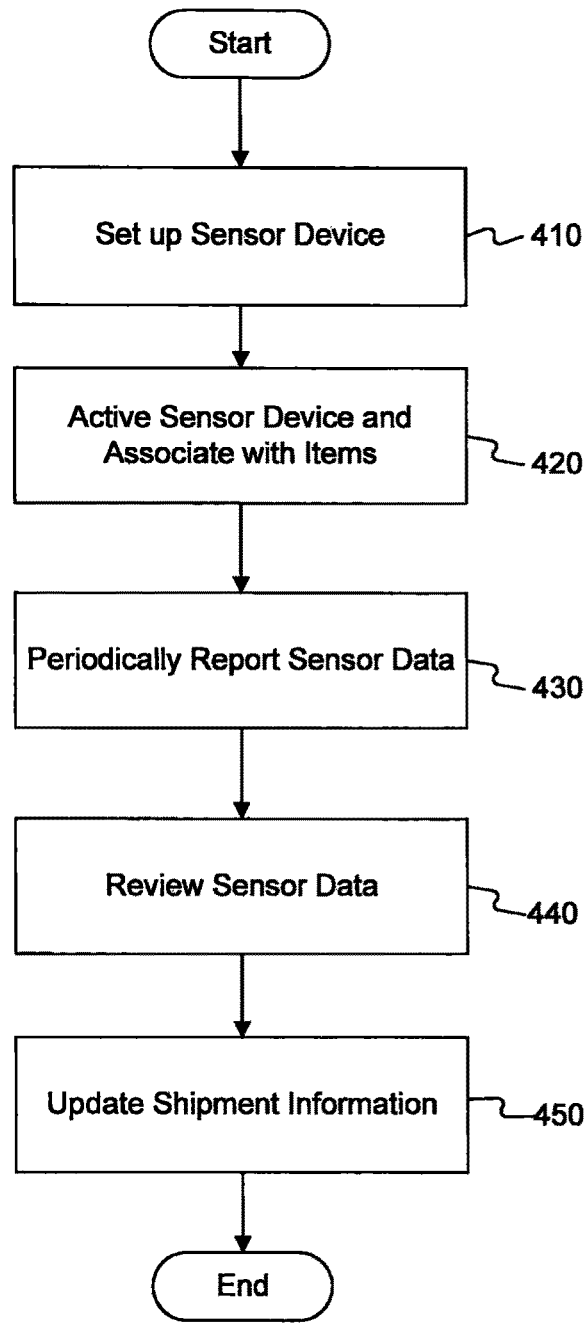
FIG. 4 illustrates a flowchart of an exemplary method for monitoring shipment information consistent with an embodiment of the present invention.

FIG. 4 illustrates a flowchart 400 of an exemplary method for monitoring shipment information, consistent with the principles of the present invention. Although the steps of the flowchart are described in a particular order, one skilled in the art will appreciate that these steps may be performed in a modified or different order, or that certain steps may be omitted. Further, one or more of the steps in FIG. 4 may be performed concurrently or in parallel.

One or more sensor devices 102a-102n are set up based on the requirements of a shipper (step 410). For example, a party may require specific programming (specifying, for example, the manner in which a device detects environmental conditions) for sensor devices 102a-102n that are to be associated with items to be sent to recipients.

Sensor devices 102a-102n may be activated and associated with the item(s) being shipped (step 420). For example, a courier or other employee of the shipper may turn on sensor device 102a and place it in or attach it to packaging associated with a corresponding item. The courier or other employee may also associate sensor device 102a with an item tracking number. For example, the courier or other employee may cause information to be stored at tracking center 104 that specifies that the item tracking number is currently assigned to an identification number for the item tracking device. Alternatively, no item tracking number is associated with sensor device 102a.

As noted above with reference to FIG. 1, sensor device 102a may include sensors that measure or detect one or more conditions such as location, temperature, light level, motion, pressure, humidity, gas level, airflow, vibrations, or other environmental conditions. Sensor device 102a that includes such sensors may transmit the sensor data either periodically, on a specified schedule, or on demand. The data is then received by tracking center 104 (step 430).

When tracking center 104 receives sensor data, tracking center 104 may store the data in device management database 206, and the information may also be stored in archive database 216 as described above. Tracking center 104 may also query analysis database 212. As stated above, analysis database 212 may contain an aggregation of all system information for use in analyzing past activities, adjusting configuration parameters, defining new monitoring activities, and predicting future trends. Using this aggregation of information, an application that may be stored on a computer-readable medium at, for example, tracking center 104 may review the information (step 440).

Based on the aggregation of information, the application may determine possible locations or zones along the shipment route that may adversely affect the integrity of the shipment. As stated above, if stored condition information indicates that shipments being routed through Phoenix in the summer experience increased temperature and vibration, the application may provide this information to the shipper, and the shipper may use this information to adjust routing habits. Instead of routing a package from Memphis to Los Angeles through Phoenix, the shipper may instead route the package from Memphis to Los Angeles through Minneapolis. If the shipper decides to modify the route of an existing shipment or a future shipment, the shipper may indicate this information to the application, and the application may update shipment information of an existing shipment or a future shipment (step 450). As previously stated, this update may occur in real-time.

While the above example indicated that the shipper modified the route, the use of the shipper (or any other party) is not needed. For example, the application may determine that the package should be re-routed, and the tracking center 104 may provide this information directly to sensor device 102a.

In addition to updating shipment information, the application may also update sensor device 102a. Based on encryption rights and regulations of different countries or zones, the application may determine the necessary encryption rights and regulations for sensor device 102a, and tracking center 104 may send instructions to sensor device 102a to reconfigure the encryption rights of sensor device 102a to meet the new requirements. This reconfiguration may be also done in real-time. In addition to real-time reconfiguration, tracking center 104 may use encryption rights and regulations to modify the configuration of sensor device 102a before shipment.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for updating shipment information of one or more items being shipped, the method comprising the steps of:
   detecting, by a first sensor device, a second sensor device entering within a proximity of the first sensor device and responsively storing association information to indicate an association between the first sensor device and the second sensor device, wherein:
      the first sensor device is configured to sense conditions of a first item being shipped, and
      the second sensor device is configured to sense conditions of a second item being shipped;
   receiving, at the first sensor device, sensor information collected by the second sensor device, wherein the sensor information indicates at least one condition of the second item;
   transmitting to a tracking center, by the first sensor device, the sensor information and the association information;
   receiving from the tracking center, at the first sensor device, updated shipment information based on at least the sensor information, wherein the updated shipment information comprises routing information for the second item;
   receiving from the tracking center, at the first sensor device, an updated configuration parameter based on at least the sensor information, wherein the updated configuration parameter reflects a modification to operation of the second sensor device;
   transmitting to the second sensor device, by the first sensor device, the updated shipment information and the updated configuration parameter;
   detecting, by the first sensor device, that the second sensor device is no longer within the proximity of the first sensor device and responsively updating the association information to remove the association between the first sensor device and the second sensor device; and
   transmitting to the tracking center, by the first sensor device, the updated association information.

2. The method of claim 1, wherein the updated shipment information is further based on historical information.

3. The method of claim 1, wherein the updated shipment information further comprises routing information for future items.

4. The method of claim 1, further comprising:
determining whether the first sensor device has sufficient battery power to receive and transmit the sensor information.

5. The method of claim 1, wherein:
the first sensor device has permission to transmit information to the tracking center; and
the second sensor device does not have permission to transmit information to the tracking center.

6. The method of claim 1, wherein:
the at least one condition comprises a temperature of the second item; and
the updated configuration parameter reflects a modification to a frequency with which the second sensor device senses the temperature of the second item.

7. The method of claim 6, wherein:
the at least one condition comprises a location of the second item; and
the updated shipment information reflects a modification to an encryption of the sensor information.

8. A non-transitory computer-readable medium storing instructions which, when executed on a processor, cause the processor to perform a method for updating shipment information of one or more items being shipped, the method comprising:
detecting, by a first sensor device, a second sensor device entering within a proximity of the first sensor device and responsively storing association information to indicate an association between the first sensor device and the second sensor device, wherein:
the first sensor device is configured to sense conditions of a first item being shipped, and
the second sensor device is configured to sense conditions of a second item being shipped;
receiving, at the first sensor device, sensor information collected by the second sensor device, wherein the sensor information indicates at least on condition of the second item;
transmitting to a tracking center, by the first sensor device, the sensor information and the association information;
receiving from the tracking center, at the first sensor device, updated shipment information based on at least the sensor information, wherein the updated shipment information comprises routing information for the second item;
receiving from the tracking center, at the first sensor device, an updated configuration parameter based on at least the sensor information, wherein the updated configuration parameter reflects a modification to sensing by the second sensor device;
transmitting to the second sensor device, by the first sensor device, the updated shipment information and the updated configuration parameter;
detecting, by the first sensor device, that the second sensor device is no longer within the proximity of the first sensor device and responsively updating the association information to remove the association between the first sensor device and the second sensor device; and
transmitting to the tracking center, by the first sensor device, the updated association information.

9. The computer-readable medium of claim 8, wherein the updated shipment information is further based on historical information.

10. The computer-readable medium of claim 8, wherein the updated shipment information further modifies a route along which future items are to be shipped.

11. The computer-readable medium of claim 8, the method further comprising:
determining whether the first sensor device has sufficient battery power to receive and transmit the sensor information.

12. The computer-readable medium of claim 8, wherein:
the first sensor device has permission to transmit information to the tracking center; and
the second sensor device does not have permission to transmit information to the tracking center.

13. The computer-readable medium of claim 8, wherein:
the at least one condition comprises a temperature of the second item; and
the updated configuration parameter reflects a modification to a frequency with which the second sensor device senses the temperature of the second item.

14. The computer-readable medium of claim 13, wherein:
the at least one condition comprises a location of the second item; and
the updated shipment information reflects a modification to an encryption of the sensor information.

15. A system for updating shipment information of one or more items being shipped, comprising:
a first sensor device configured to sense conditions of a first item being shipped; and
a tracking center, wherein:
the first sensor device configured to:
detect a second sensor device entering within a proximity of the first sensor device and responsively store association information to indicate an association between the first sensor device and the second sensor device, wherein the second sensor device is configured to sense conditions of a second item being shipped,
receive sensor information collected by the second sensor device, wherein the sensor information indicates at least one condition of the second item,
transmit to the tracking center the sensor information and the association information,
receive from the tracking center updated shipment information, wherein the updated shipment information comprises routing information for the second item,
receive from the tracking center an updated configuration parameter, wherein the updated configuration parameter reflects a modification to sensing by the second sensor device,
transmit to the second sensor device the updated shipment information and the updated configuration parameter,
detect that the second sensor device is no longer within the proximity of the first sensor device and responsively update the association information to remove the association between the first sensor device and the second sensor device, and
transmit to the tracking center the updated association information; and
the tracking center is configured to:
receive the sensor information transmitted from the first sensor device,
based on at least the sensor information, generate the updated shipment information,
based on at least the sensor information, generate the updated configuration parameter, and transmit the updated shipment information and the updated configuration parameter to the first sensor device.

16. The system of claim 15, wherein generating the updated shipment information based on at least the sensor information comprises generating the updated shipment information based on the sensor information and historical information stored at the tracking center.

17. The system of claim 15, wherein the updated shipment information further modifies a route along which future items are to be shipped.

18. The system of claim 15, wherein the first sensor device is further configured to:
   determine whether the first sensor device has sufficient battery power to receive and transmit the sensor information.

19. The system of claim 15, wherein:
   the first sensor device has permission to transmit information to the tracking center; and
   the second sensor device does not have permission to transmit information to the tracking center.

20. The system of claim 15, wherein:
   the at least one condition comprises a temperature of the second item; and
   the updated configuration parameter reflects a modification to a frequency with which the second sensor device senses the temperature of the second item.

21. The system of claim 20, wherein:
   the at least one condition comprises a location of the second item; and
   the updated shipment information reflects a modification to an encryption of the sensor information.

* * * * *